United States Patent [19]

Haiges

[11] Patent Number: 4,476,813
[45] Date of Patent: Oct. 16, 1984

[54] AUTOMATIC LIVESTOCK WATERING TROUGH

[75] Inventor: Adolf Haiges, Bönnigheim, Fed. Rep. of Germany

[73] Assignee: Suevia Haiges GmbH & Co., Fed. Rep. of Germany

[21] Appl. No.: 471,489

[22] Filed: Mar. 2, 1983

[30] Foreign Application Priority Data

Mar. 3, 1983 [DE] Fed. Rep. of Germany ... 8205822[U]

[51] Int. Cl.³ .............................................. A01K 7/06
[52] U.S. Cl. ................................................... 119/75
[58] Field of Search ........................................ 119/75

[56] References Cited

U.S. PATENT DOCUMENTS

| | | | |
|---|---|---|---|
| 1,365,934 | 1/1921 | Mitchell | 119/75 |
| 2,260,817 | 10/1941 | Anderson | 119/75 |
| 3,144,853 | 8/1964 | Blough | 119/75 |

FOREIGN PATENT DOCUMENTS

| | | | |
|---|---|---|---|
| 2854495 | 6/1980 | Fed. Rep. of Germany | 119/75 |
| 956521 | 4/1964 | United Kingdom | 119/75 |

*Primary Examiner*—Hugh R. Chamblee
*Attorney, Agent, or Firm*—Wigman & Cohen

[57] ABSTRACT

A stable metal plate for watering tanks having a rear wall of plastic or sheet metal is disclosed. The metal plate functions to give this material the necessary strength at the attachment points such that the rear wall of the tank may be securely attached to a standpipe or wall. The metal plate engages the rear wall from the outside for attachment, and serves to secure the watering tank by clamping the rear wall thereof between the metal plate on one side and the standpipe or wall on the other side by means of a U-bolt or two dowel screws.

18 Claims, 8 Drawing Figures

AUTOMATIC LIVESTOCK WATERING TROUGH

BACKGROUND OF THE INVENTION

The present invention relates to an automatic livestock watering tank made of a plastic material. More particularly, the present invention relates to an automatic livestock watering tank having a rear wall containing holes which may be placed against a standpipe containing radial holes, or against a wall.

In such tanks made of plastic, which until the present time, have been few in comparison with automatic livestock watering tanks of metal, particularly cast iron, the attachment of the tank to a standpipe or to a wall was attempted by means of metallic inserts in the plastic material or by means of metallic reinforcement. This structure was intended to give the plastic material the necessary strength, particularly at the points of attachment. Aside from the high manufacturing expense, these means of attachment have not proven themselves in practice.

SUMMARY AND OBJECTS OF THE INVENTION

It is a primary object of the present invention, therefore, to create an automatic livestock watering tank of the abovedescribed type which can be easily and reliably attached to a standpipe or wall without itself being damaged during attachment.

Briefly described, this and other objects of the invention are accomplished by the use of a metal plate arranged on the inside of the rear wall of the watering tank having a bolt for the engagement in the pipe bore or for penetration into the wall. This bolt projects vertically through an opening, particularly a hole in the rear wall. The plate may have two attachment openings, particularly attachment holes which align with holes in the rear wall or a U-bolt which can be placed in abutment against the standpipe, the shanks of which engage through the pair of aligned holes and are provided with nuts which can be tightened against the plate. Also, the plate can be secured by two wall dowel screws which engage through the pair of aligned holes and whose heads or nuts can be tightened against the plate. By this means, the tank basin and the rear wall of the tank can be manufactured of plastic in a simple manner without having to utilize inserts or reinforcements. Most importantly, however, the mounting (and dismounting) of the tank is selectively possible on a standpipe or on a wall, and may be accomplished in such a manner that the tank is not pivotable about an elevated axis, namely the vertical pipe axis. This is true even in the case of its attachment to a standpipe. When the automatic livestock watering tank of the present invention is attached to a wall, it is best to allow the bolt to penetrate into the wall at a joint, where a better hold is assured.

In one advantageous embodiment of the automatic livestock watering tank according to the present invention, the rear wall includes a depression on its inner side, in which the plate lies. As a result, the tank is not only clamped between the plate and the standpipe or wall, but is also suspended on the plate, which improves its attachment.

In a first embodiment of the present invention, the bolt has a point which penetrates into the wall, thus significantly simplifying the sinking of the bolt.

In another embodiment of the present invention, the semicircular, curved, threadless yoke of the U-bolt includes projections on its concave inner side which penetrate into the standpipe. These projections can be produced, for example, by squeezing the U-bolt material. These projections embed themselves in the standpipe used for attachment when the nuts are tightened.

In a first embodiment, the rear wall includes spacers which maintain a distance from a wall and whose frontal surfaces lie in one and the same plane. The attachment of the tank to a wall is accomplished by the bolt end penetrating into the spacer plane, so that the tank is actually anchored in the wall by means of the bolt points.

In a first embodiment using a water supply valve consisting of a stationary nozzle and a movable closing body, and having a rotatable lever having a shorter arm which supports the closing body and a spring-biased longer arm as a valve activating tongue which is pivotable about a horizontal axis, the lever is hinged to the metal plate and the spring is supported against the plate. The rigid plate thus forms a solid hinge point and support. If the hinge support was made of plastic, it would not have the necessary long life, since the strenuous movement of the livestock using the automatic watering tanks would soon damage it. Finally, the spring in the first embodiment is mounted on an extension of the bolt which extends forward through the plate. By this means, the end of the spring supported against the plate is easily prevented from deflecting laterally.

German GS No. 8,205,205 teaches an automatic livestock watering tank having two vertically aligned bores to receive and axially fix a straight section of a water supply line and to which a valve device with a suspended valve activating device is connected by means of a screw cap. The screw cap is supported on both sides of the valve device by two bosses which are provided on the rear wall of the tank. However, these bosses cannot prevent an animal from pressing the valve device, together with the supply line section which ends there, from the front towards the back, so that the valve activating device can no longer be caused to open the valve. In order to avoid this disadvantage, a second embodiment of the automatic livestock watering tank according to the present invention utilizes a metal plate provided with a colinear ram on its side opposite the bolt, which ram cooperates with a screw cap arranged at the same height as the ram to provide lateral support for the valve device. The arrangement of ram and screw cap is selected such that, with a vertically disposed linear arrangement of supply line section, valve device and its activating device both lie against each other at a distance from the rear wall. Thus, even the slightest deflection of the valve device against the rear wall is impossible.

In order to simplify the manufacture of the metal plate of the second embodiment, the bolt and the ram form a stepped metal cylinder, which sits, for example, rigidly, in a coaxial bore in the metal plate against which the edges of the ram abut.

In the third and fourth embodiments of the automatic livestock watering tank according to the present invention, two attachment elements which form the rear wall are utilized. An opening in the rear wall is formed between these two elements. The metal plate is provided at its ends with perpendicularly bent mounting straps, which support the attachment elements at the sides. The mounting straps assure correct positioning when attaching the tank. This is important because the openings in the metal plate or in the rear tank wall must be brought into the proper covering position. They must also hold together the portions of the tank which undergo the most severe loads during attachment.

The third and fourth embodiments are tanks having a connection housing which receives the elbow or T-element of a water line, and which includes two parallel side walls. The embodiments are formed such that both side walls each have an opening to accomodate the metal plate, which engages the rear wall of the tank. This allows the desired lateral support of the tank attachment elements for the rear tank wall with no problem. Of the two openings, one can have a smaller extension more perpendicular to the rear tank wall than the other, which must allow for a pivoting of the metal plate together with the bolts on one end of the plate.

Both the third and fourth embodiments are tanks whose connection housings include a front wall having a bore for single-hole mounting of a second elbow or a valve housing; the front wall facing a watering basin. With this single-hole mounting, the above-mentioned attachment problem occurs in a similar manner to those tanks not made of metal or cast iron, because plastic material does not necessarily possess the desired strength and useful life. Therefore, the present invention contemplates that the edge of the mounting hole of the housing front wall be clamped between two metal plates. Those metal plates are connected with each other by means of two threaded bolts which penetrate through the front wall and mount the second elbow or the valve housing.

In the third embodiment, the front wall of the connection housing is provided on its inner side with a cross member upon which the inside clamping plate is supported to improve its mounting stability.

In the third embodiment, the second elbow is provided with a water flow adjusting screw. A valve device, with a suspended valve activating device, is connected to the second elbow by means of a screw cap. Furthermore, the outside clamping plate and the second elbow or the valve housing are formed in one piece. This allows the achievement of a precise dosing of the maximum water flow and also provides for an easy activation of the valve. Also, the mounting of the second elbow or the valve is simplified.

In the fourth embodiment, the valve housing is provided with at least one eye for hinging of a valve activating flap. Such an eye is often used and is thus mounted in accordance with the purposes of the present invention, because the two screwed metal plates completely eliminate the possibility of an animal dangerously pivoting the flap about the axis of the valve housing by pushing laterally on the flap.

With these and other objects, advantages and features of the invention that may become hereinafter apparent, the nature of the invention may be more clearly understood by reference to the following detailed description of the invention, the appended claims and to the several drawings attached herein.

DETAILED DESCRIPTION OF THE PREFERRED EMBODIMENT

Figure 1:
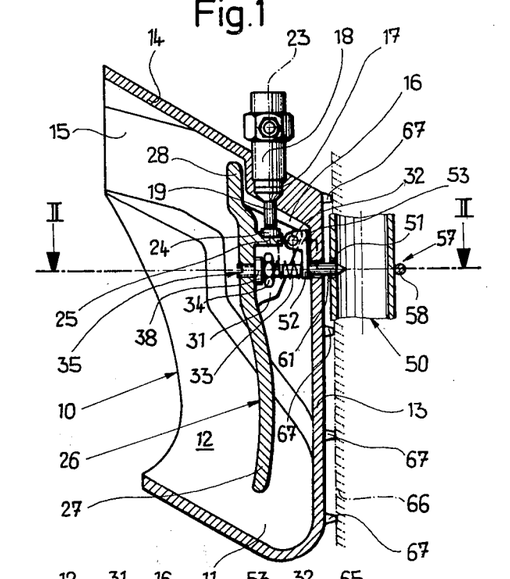
FIG. 1 is a drawing of a central vertical longitudinal section through the first embodiment of the invention in connection with a standpipe, according to the line I—I in FIG. 2.
Figure 2:
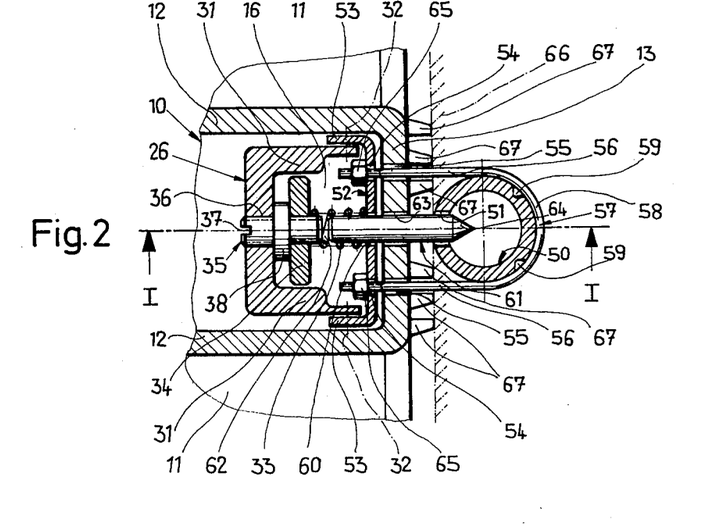
FIG. 2 is a drawing of a horizontal cross section through the first embodiment of the invention in connection with the standpipe, according to the line II—II in FIG. 1.

Referring now in detail to the drawings wherein like parts are designated by like numerals throughout, there is illustrated in FIGS. 1 and 2 a tank 10 having a watering basin 11, side walls 12 and rear wall 13 all of which extend into and become a cover wall 14, which extends over the entire basin. To the extent that the side walls 12 border on the watering basin 11, they run as smooth walls parallel to each other. In the portion adjacent the rear wall 13, however, the two side walls 12 form depressions 15 directly over the watering basin. These depressions face each other and form the means by which the space 16 lying between the depressions is narrowed to less than the width of the snout of a pig. A valve nozzle 19, which sits in the lower end of a stepped bore 17, opens from above into this intermediate chamber 16. A water pipe connection support 18 is sealingly screwed into the outer end of the bore 17, which is provided with an internal threading. A closing body 24 in the form of a rubber disc is provided to close the opening of the nozzle 19. This closing body 24 is mounted on an arm 25, which is horizontal when the valve 19 is closed. The closing body 24 extends backward perpendicularly from a basically vertical valve activating lever 26, the lower arm 27 of which forms a valve activating tongue and whose upper arm 28 functions as a splash protector. The lever 26 includes flaps 31 arranged at the height of the arm 25 parallel to the side walls 12, by means of which the lever 26 is pivotably mounted about a horizontal axis 32. The axis 32 is located between the downward extension of the nozzle axis 23 and the rear wall 13, such that when the lower lever arm 27 approaches the rear wall 13, the closing body 24 lifts away from the opening of the nozzle 19, thereby opening the valve. In order to keep the valve 19-24 closed, a helical compression spring 33 is provided, which is arranged between the rear wall 13 and the lower lever arm 27 and between the two flaps 31. The front end of the spring 33 is supported against a hex nut 34, which serves as a stop and is secured against rotation by edge contact against the flaps 31. The nut 34 sits on a screw 35, which projects through a hole 36 in the lower lever arm 27 and includes a slot 37 on its front end for engagement with a screwdriver. The screw 35 includes a collar or flange 38, which lies loosely on the back side of the lower lever arm 27. The collar 38 can function to vary the compression of the spring 33 by shifting the nut 34, and thereby adjusting the force with which the closing body 24 is pressed against the valve nozzle 19.

The mounting of the valve activating lever 26 on the tank 10, which is made of plastic material, and is attached to a vertical standpipe 50 having radial bores 51 is performed in the following manner:

An approximately rectangular metal plate 52 is arranged in the intermediate chamber 16 directly beneath the cover wall 14. The metal plate 52 is provided in its upper half with two lateral straps 53, which are bent forward at a right angle, to which the valve activating lever 26 is hinged by means of its two flaps 31 attached from the inside to the straps. The plate 52 includes at the average height two holes 54 adjacent the straps 53, with which each hole 55 in the rear wall 13 of the tank 10 aligns. The two bolt shanks 56 of a U-bolt 57 are inserted through the hole pair 54–55, which U-bolt 57 surrounds the standpipe 50 on its side opposite the tank 10 by means of its semi-circular, curved, threadless yoke 58, and embeds itself slightly in the pipe by means of small projections 59 arranged on the concave inner side of the yoke.

A bolt 61, which projects perpendicularly from the plate on both sides thereof and is rigidly connected with the plate, for example, by welding on the inside of the plate, is arranged in a hole 60 in the center of the lower half of the plate 52. Accordingly, the bolt axis and the axis of the screw 35 are colinear and the two adjacent ends of the bolt 61 and the screw, which support the respective ends of the spring 33 associated therewith, are separated by a gap 62. This gap is large enough to permit the pivoting movement of the valve activating lever 26.

The bolt 61 projects through a hole 63 in the rear wall 13 of the tank 10 aligned with the hole 60 in the plate 52. It extends so far into free space that it extends through the hole 51 of the standpipe 50 so that its point 64 lies inside the pipe. The diameter of the wall hole 63, of the bolt 61 and the pipe hole 51 are adapted to each other, so that the bolt is loaded by the weight of the tank 10 in order to avoid shearing. The diameter of the bolt 61 and the wall thickness of the standpipe 50 are selected accordingly.

Nuts 65 are screwed onto the threaded shanks 56, which nuts are tightened against the inside of the plate 52 and can be provided with lock nuts.

For placement against a wall 66, the rear wall 13 of the tank 10 is provided on its outer side with several spacers 67, the frontal surfaces of which lie in one and the same plane, which coincides with the plane of the wall.

The tank 10 can selectively be attached to the wall 66 instead of to the standpipe 50, whereby the point 64 of the bolt 61 penetrates into the wall material, for example into a joint, because the bolt point 64 ends on the other side of the frontal plane of the spacers 67. In this case, the U-bolt 57 is replaced with two wall dowel screws, which are anchored in the wall 66.

Figure 3:
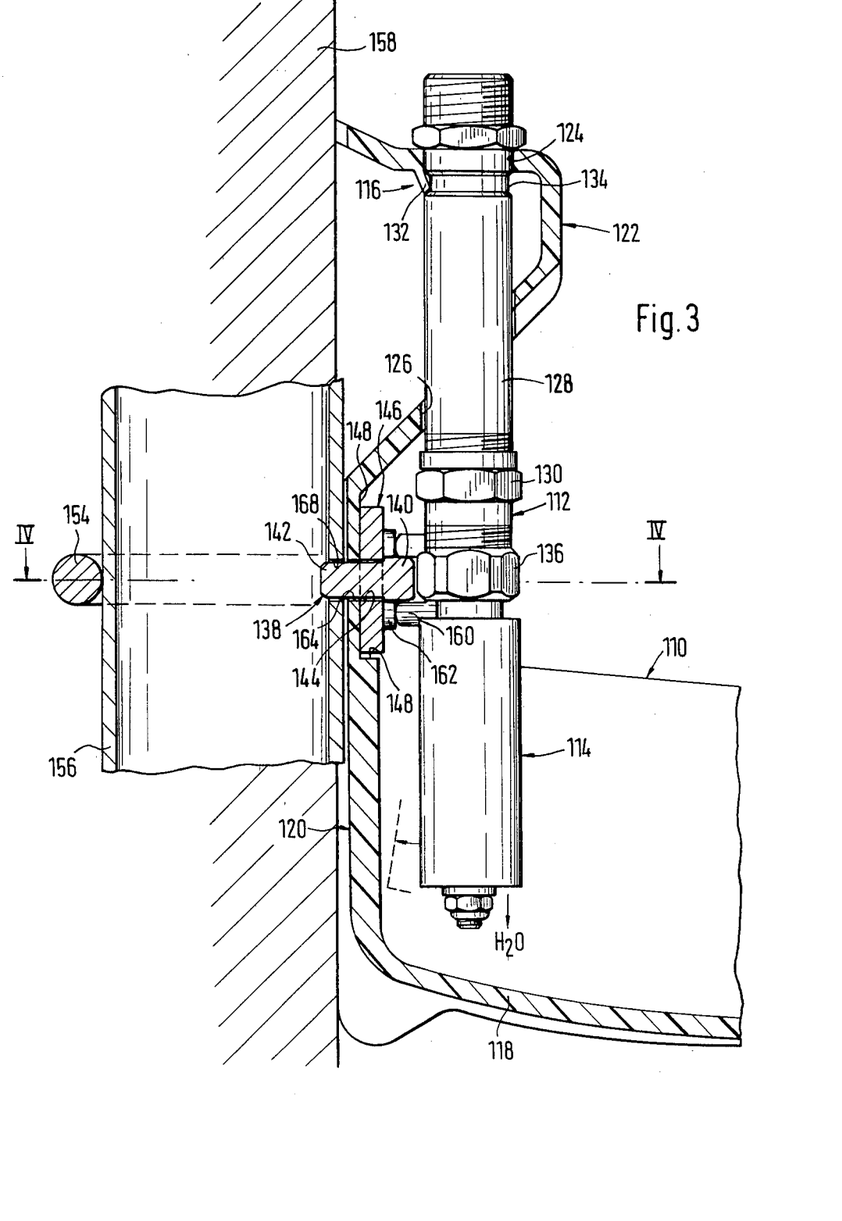
FIG. 3 is a drawing of a central vertical longitudinal section through the second embodiment of the invention in connection with a standpipe and a wall, according to the straight line III—III in FIG. 4.
Figure 4:
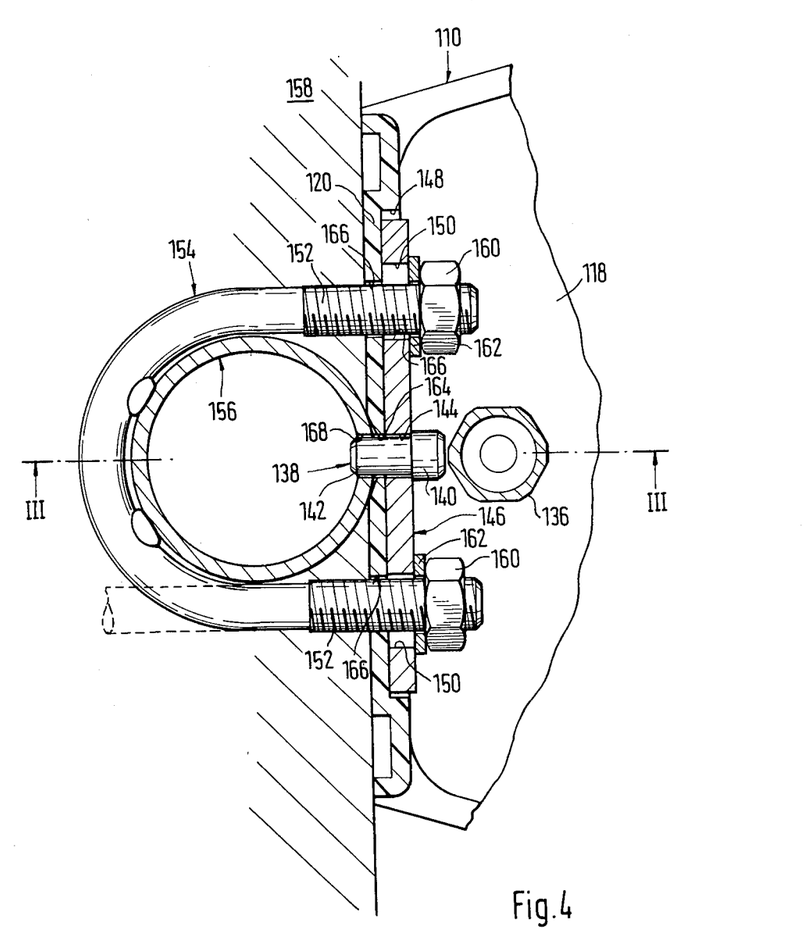
FIG. 4 is a drawing of a horizontal cross section through the second embodiment of the invention in connection with the standpipe or the wall, according to the straight line IV—IV in FIG. 3.

The second embodiment of the present invention, as shown in FIGS. 3 and 4, has a watering tank 110, which is provided with a valve device 112 arranged in the back of the tank, an activating device 114 associated with this device and an attachment device 116.

The tank 110 includes a water basin 118, a smooth vertical rear wall 120 and an attachment 122 forming a V in vertical longitudinal section. The attachment 122 is joined to the top of the rear wall and is provided with vertically aligned holes 124 and 126, which receive a pipe-like support 128 having a slight amount of radial play. The upper end of the vertical support 128, which is provided with an external threading, can be detachably connected to a vertical water supply line.

The valve device 112 with suspended activating device 114 is screwed to the lower end of the support 128 by means of a screw cap 130.

The entire watering tank 110 is manufactured in one piece of homogeneous plastic material, whereby an elastically deformable lip-like spring 132 is formed on the lower edge of the upper bore 124. This spring 132 is downwardly directed at an angle and extends over one-half of the circumference of the edge of the hole, namely along the rear half of the edge. The spring 132 engages in an annular groove 134, forming the attachment device 116. The annular groove 134 is formed in the support 128, which is axially upwardly fixed.

The activating device 114 is detachably mounted to the valve device 112 by means of a second screw cap 136, so that it is suspended from said valve device and can be laterally deflected in all directions, and especially in the direction of the rear wall 120. In order to prevent this deflection from also pressing the valve device 112 to the side, in which case the support 128 could deform the attachment 122, the screw cap 136 laterally abuts a stepped metal cylinder 138. The cylinder 138 consists of a front ram 140 and a rear bolt 142, which sits rigidly in a coaxial bore 144 in a smooth, rectangular metal plate 146, on the bore edge of which the ram 140 abuts. The metal plate 146 lies with its longitudinal direction horizontal in a rectangular edge depression 148 in the rear wall 120 bordering the attachment 122. Along its center line, the metal plate 146 is provided at both ends with respective longitudinal holes 150, through which respective externally threaded bolt shanks 152 of a U-bolt 154 corresponding to the U-bolt 57 of the first embodiment are inserted. The U-bolt 154 in this embodiment is placed around a vertical standpipe 156 in order to attach the watering basin or tank 110. Or, as indicated, it can be replaced by two screws anchored by means of dowels in a wall 158, against which the rear wall 120 of the tank 110 should be thought of as resting.

A nut 160 is screwed onto each bolt shank 152, which nuts are tightened against the edge of their associated longitudinal holes 150 via washers 162. The metal plate 146 includes a central hole 164 along its horizontal center line and two lateral holes 166, through which the two bolt shanks 152 are inserted. A frontally blunt bolt 142 projects through the hole 164 into a hole 168 in the standpipe 156. If the watering tank 110 is to be attached to a wall 158, a pointed bolt 142 would be used.

Figure 5:
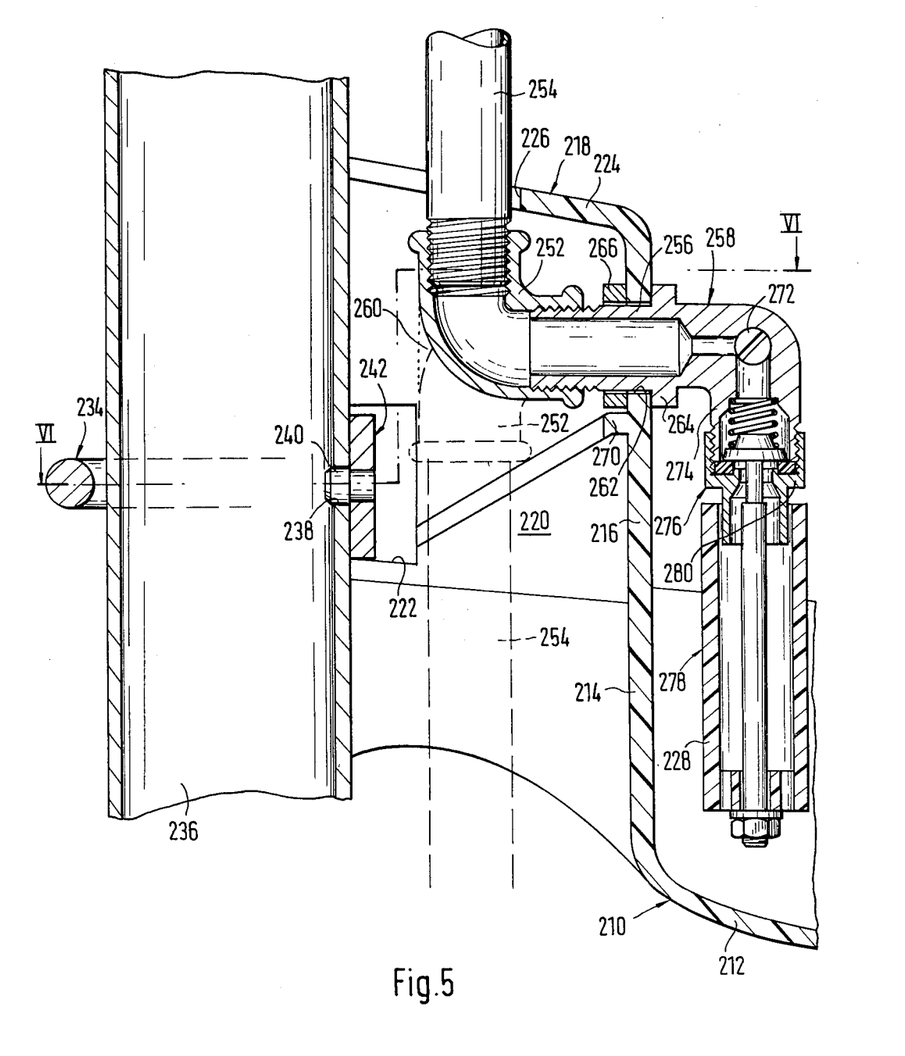
FIG. 5 is a drawing of a central vertical longitudinal section through the third embodiment of the invention in connection with a standpipe, according to the straight line V—V in FIG. 6.
Figure 6:
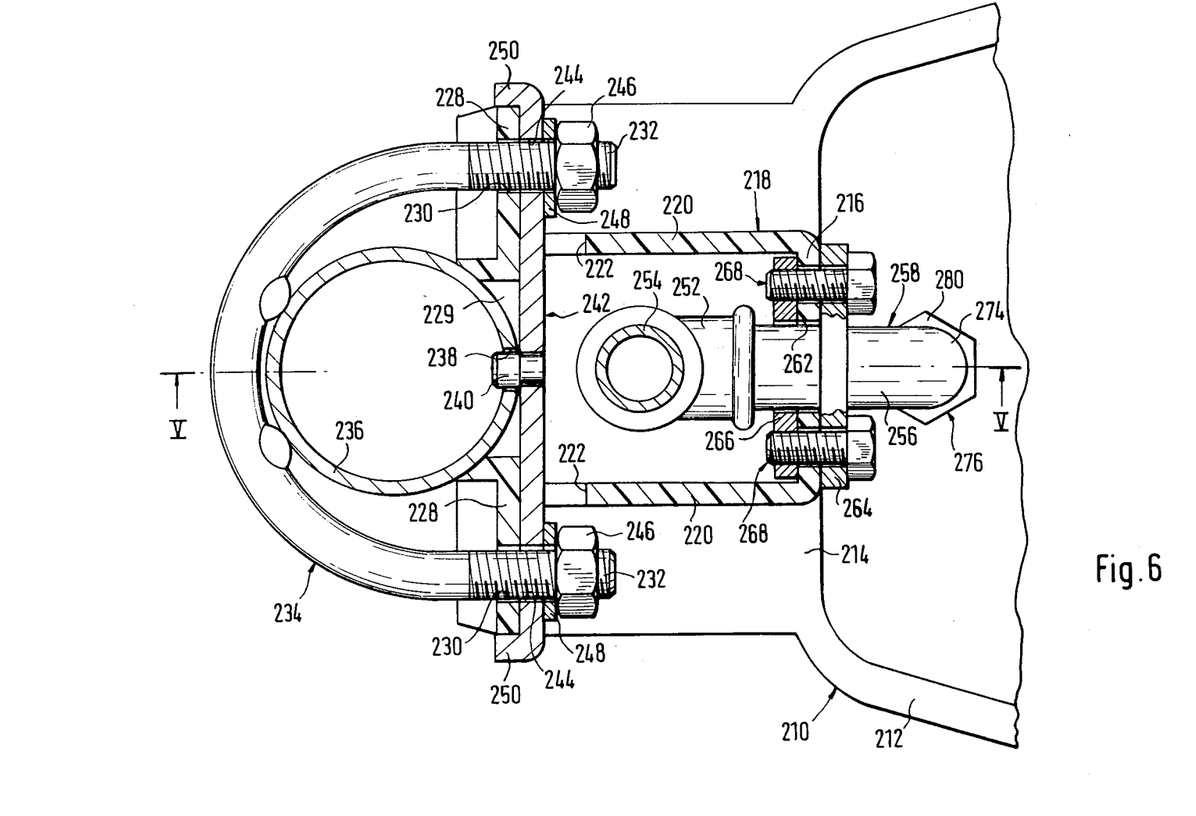
FIG. 6 is a drawing of a stepped horizontal cross section through the third embodiment of the invention in connection with the standpipe, according to the perpendicularly bent line VI—VI in FIG. 5.

The third embodiment according to FIGS. 5 and 6 illustrates a watering tank 210 having a watering basin 212, to the rear wall 214 of which the front wall 216 of a connection housing 218 is formed in one piece, being centered near the top of the rear wall 214. This connection housing 218 has two parallel side walls 220, each having a rear edge recess 222 and a cover 224 with an opening 226, but is open at its lower side. The watering tank 210 is provided with two flange-like attachment elements 228 formed as one piece with the connection housing 218. These elements 228 are formed as the rear wall, and are symmetrically arranged with respect to the vertical dividing plane V—V of the tank. Each attachment element 228 has a hole 230 to receive one of two bolt shanks 232 of the U-bolt 234 gripping a vertical standpipe 236. This pipe 236 includes a hole 238 to receive a bolt 240, which is anchored in the center of a smooth, rectangular metal plate 242 arranged with its longitudinal direction horizontal. This metal plate 242 is arranged with its shorter, vertical center line in abutment against the standpipe 236. Its two lateral ends are flush against the respective two attachment elements 228, the holes 230 of which align with holes 244 in the metal plate 242 to receive the bolt shanks 232. Respective nuts 246 are screwed onto the front of these shanks and are tightened against the metal plate 242 using a washer 248. The metal plate 242 is provided on both of its lateral ends with a mounting strap 250 formed in one piece therewith and bent at a right angle to the rear. These mounting straps 250 laterally engage the outer corners of the associated attachment elements 228.

The intermediate space 229 formed by the two attachment elements 228 forms an opening in the rear tank wall, which encloses a portion of the circumference of the standpipe 236.

In the illustrated embodiment a right-angled elbow 252 in the connection housing 218 connects a pipe end 254 of a water supply line which projects vertically through the opening 226, to the horizontal shank 256 of a second elbow 258. As indicated by the broken lines in FIG. 5, the pipe end 254 can selectively project from beneath into the connection housing 218. As indicated in FIG. 5 by a dotted line, a Tjoint 260 interrupts a vertical water supply line extending through the interior of the connection housing 218.

The horizontal shank 256 of the second elbow 258 is inserted through a hole 262 in the front wall 216 of the connection housing 218 and has a flange-like attachment collar 264, which lies against the outside of the front wall 216. A strap 266, corresponding to the collar 264, contacts the inside of the front wall 216. The strap 266 is placed on the horizontal shank 256 of the second elbow 258 and is connected with the collar 264 by means of two threaded connections 268 in such a manner that the attachment collar and strap clamp the edge of the bore 262 formed in the front wall 216 and thereby secure the second elbow 258. To support the strap 266, a rib 270 is formed as a cross-piece on the inside of the front wall 216 of the connection housing 218.

A regulating screw 272 is located in the bend of the second elbow 258 to allow adjustment of the water flow. This flow is led downward through a vertical shank 274 of the second elbow 258 into a valve device 276 having a suspended activating device 278. The valve device 276 is connected to the vertical shank 274 of the second elbow 258 by means of ascrew cap 280. By laterally deflecting a normally vertically disposed sleeve 282 of the valve activating device 278, for example, in the direction of the rear wall 214 of the watering basin 212, a flow of water through the sleeve is effected.

Figure 7:
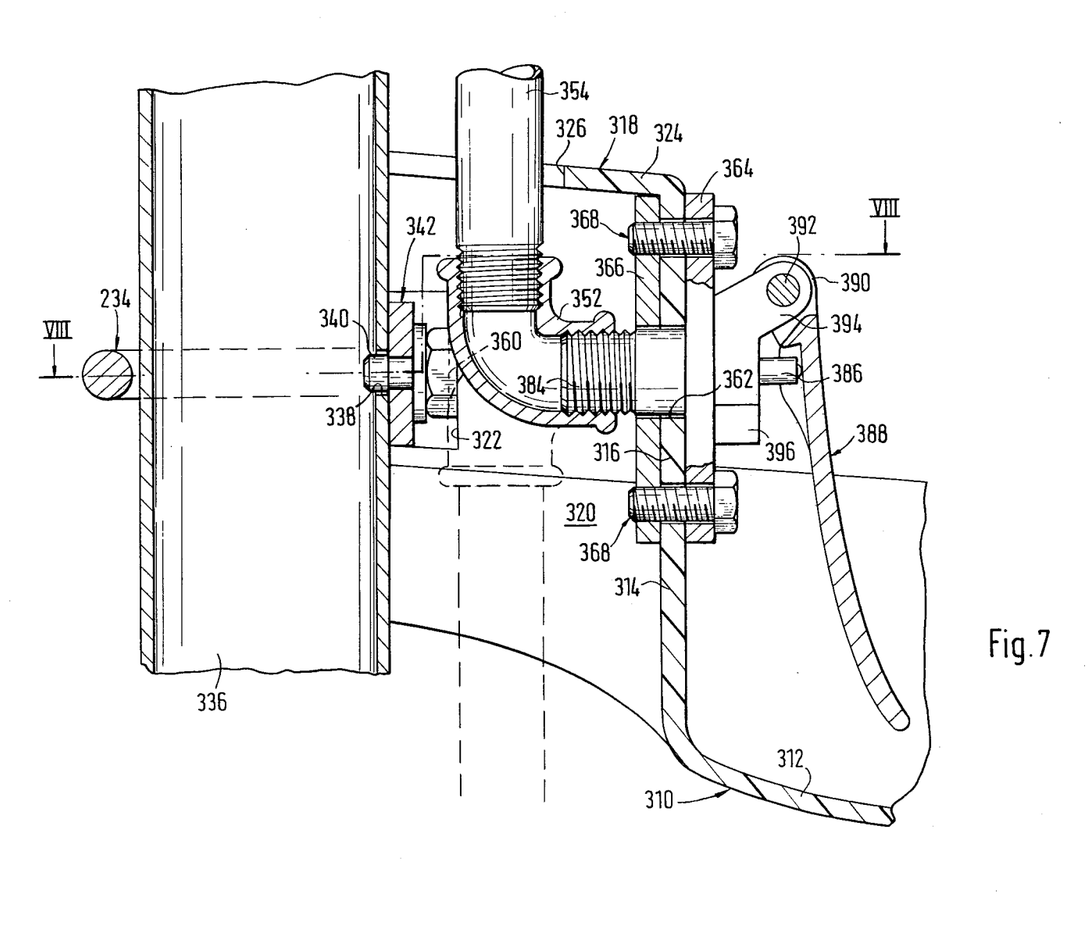
FIG. 7 is a drawing of a central vertical longitudinal section through the fourth embodiment of the invention in connection with a standpipe, according to the straight line VII—VII in FIG. 8.

A fourth embodiment illustrated to FIGS. 7 and 8, largely corresponds to the third embodiment, so that the above description is also applicable to the fourth embodiment, unless otherwise stated below. To the extent that the fourth embodiment corresponds with the third embodiment, the same or corresponding elements are provided with reference numbers in the drawing increased by 100.

Instead of a second elbow for a valve device having an activating device, as is present in the third embodiment, the fourth embodiment utilizes a cylindrical valve housing 384 in place of the horizontal shank of the second elbow. This housing 384 is rigidly mounted to the front wall 316 of the connection housing 318 by means of an attachment collar 364 and strap 366, which here are both rotated into vertical positions. The valve housing 384 contains a coaxial valve ram 386, which projects horizontally forward over the watering basin 312 and can be pushed backward against a return force by means of a valve activating flap 388, which is a singlearmed lever. The flap 388 is rotatably mounted on a horizontal axis 392 with two eyes 390 arranged at its upper end. The horizontal axis, in turn, is mounted in a longitudinal eye 394 which projects from a ring 396 which surrounds the ram 386 and is located on the front side of the attachment collar 364, for example, by being formed in one piece therewith.

Figure 8:
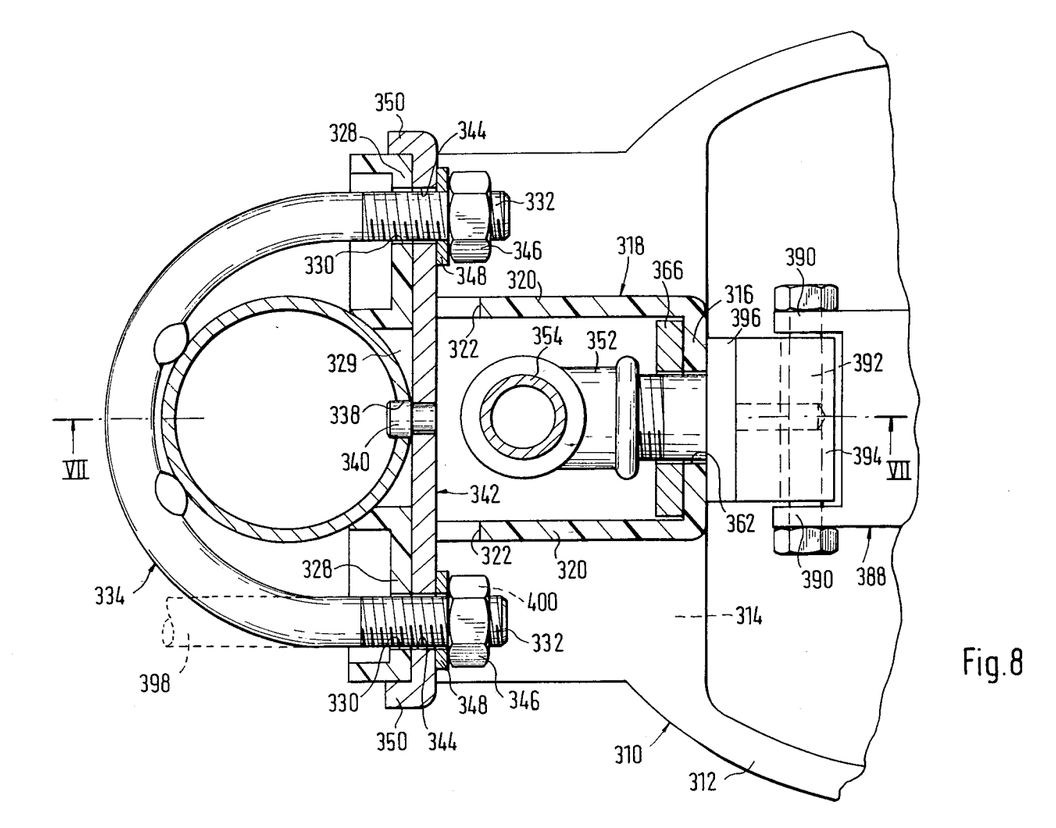
FIG. 8 is a drawing of a stepped, horizontal cross section through the fourth embodiment of the invention in connection with the standpipe, according to the bent line VIII—VIII in FIG. 7.

As shown in FIGS. 4 and 8 by dotted lines, in every embodiment where a U-bolt is employed, the U-bolt can be replaced by two wall dowel screws 398 used in place of the two threaded shanks. The wall dowel screws 398 are either anchored in a wall and provided with respective nuts corresponding to the nuts 346, or they may include screw heads 400 which replace the nuts and can be screwed into the doweled wall.

Although only a preferred embodiment is specifically illustrated and described herein, it will be appreciated that many modifications and variations of the present invention are possible in light of the above teachings and within the purview of the appended claims without departing from the spirit and intended scope of the invention.

1. Apparatus for securing an automatic livestock watering tank to a wall or a standpipe having a radial hole, said automatic livestock watering tank having a rear wall made from a flexible material and having holdes in said rear wall, comprising:
  a metal plate arranged on the inside of the rear wall, said metal plate having a perpendicular bolt aligned with a first hole of said automatic livestock watering tank, said bolt being secured to said metal plate and penetrating said first hole in said rear wall of said tank and penetrating into one of said standpipe hole or wall; and
  said metal plate further having at least two holes aligned with an equal number of holes in said automatic livestock watering tank and through which aligned holes securing means pass for separably connecting said metal plate to one of said standpipe or wall.

2. The apparatus of claim 1, wherein the rear wall includes a depression on its inner side in which the metal plate lies in a closely fitting manner.

3. The apparatus of claim 1, wherein the bolt includes a point which penetrates into said wall.

4. The apparatus of claim 1, further including two attachment elements forming the rear wall, between which one of said holes of the rear wall is formed, and said metal plate is provided at its ends with perpendicularly bent mounting straps which take said attachment elements at their sides.

5. The apparatus of claim 1, wherein said securing means comprises a U-bolt whose shanks extend through a pair of said aligned holes after placement of said U- bolt against said standpipe, said shanks being provided with nuts tightened against said metal plate.

6. The apparatus of claim 5, wherein said U-bolt includes a semi-circularly, curved, threadless yoke having projections on its concave inner side which penetrate into the standpipe.

7. The apparatus of claim 1, wherein said bolt penetrates into said wall; and said securing means comprises dowel screws which extend through an equal number of said aligned holes and are provided with nuts or heads which are tightened against said metal plate.

8. The apparatus of claim 7, further including spacers which hold the rear wall of the tank at a distance from a wall, the frontal surfaces of which spacers lie in the same plane, and the end of said bolt extends through the spacer plane.

9. The apparatus of claim 1, further including a water supply valve comprising a stationary nozzle connected to the tank and a moveable closing body, as well as a rotatable lever having a shorter arm supporting the closing body and a longer spring-biased arm as a valve activating tongue, which is pivotable about a horizontal axis, and said lever is hinged to said metal plate and the spring is supported against and said metal plate.

10. The apparatus of claim 9, wherein said spring is mounted on an extension of the bolt passing forward through said metal plate, said spring being biased against said lever to maintain said valve in a closed position.

11. The apparatus of claim 1, further including two vertically aligned bores in said tank to receive and axially fix a straight section of a water supply line to which a valve device with a suspended valve activating device is connected by means of a screw cap. and said metal plate is provided with a colinear ram on its side opposite the bolt, which ram cooperates with said valve device arranged at the same height as the ram to provide lateral support for the valve device.

12. The apparatus of claim 11, wherein said bolt and said ram form a stepped metal cylinder, which sits in a coaxial hole in said metal plate and one of said ram and bolt abuts the edge of said hole.

13. The apparatus of claim 1, further including a connection housing to receive one of an elbow and a T-connection of a water supply line, said connection housing including two parallel side walls, and both side walls having an opening to accomodate said metal plate which engages on the rear wall of the tank.

14. The apparatus of claim 13, wherein said connection housing further includes a front wall facing a watering basin of said tank, which wall has a hole to provide for single-hole mounting of one of a second elbow and a valve housing and the edge of the mounting hole in the housing front wall is clamped between inside and outside metal plates which are connected with each other by means of two screw bolts extending through the front wall and mount one of the second elbow and the valve housing.

15. The apparatus of claim 14, wherein the front wall of the connection housing is provided on its inner side with a cross member upon which the inside clamping plate is supported.

16. The apparatus of claim 14, wherein the second elbow is provided with a water flow adjustment screw and further includes a valve device with a suspended valve activating device, said valve device being connected to the second elbow by means of a screw cap.

17. The apparatus of claim 14, wherein the outside clamping plate and one of the second elbow and the valve housing are formed in one piece.

18. The apparatus of claim 17, wherein the valve housing is provided with at least one eye to allow for the hinging of a valve activating flap thereto.

* * * * *

UNITED STATES PATENT AND TRADEMARK OFFICE
CERTIFICATE OF CORRECTION

PATENT NO. : 4,476,813
DATED : October 16, 1984
INVENTOR(S) : Adolph Haiges

It is certified that error appears in the above—identified patent and that said Letters Patent is hereby corrected as shown below:

IN THE SPECIFICATION:

Column 1, line 27 - change "abovedescribed" to --above-described--.
Column 7, line 35 - "Tjoint" should be --T-joint--.

line 58 - "ascrew" should be --a screw--.

IN THE CLAIMS:

Claim 1, line 41 - replace "holdes" with --holes--.

Claim 9, line 20 - replace "tothe" with --to the--.

Claim 11, line 36 - replace "cap." with --cap,--.

Signed and Sealed this

Twenty-fifth Day of June 1985

[SEAL]

Attest:

DONALD J. QUIGG

Attesting Officer     Acting Commissioner of Patents and Trademarks